W. C. HYATT.
EXERCISE SHEET FOR TEACHING TYPE WRITING.
APPLICATION FILED NOV. 3, 1913.

1,175,061.

Patented Mar. 14, 1916.

UNITED STATES PATENT OFFICE.

WALTER C. HYATT, OF SEATTLE, WASHINGTON.

EXERCISE-SHEET FOR TEACHING TYPE-WRITING.

1,175,061.

Specification of Letters Patent. Patented Mar. 14, 1916.

Application filed November 3, 1913. Serial No. 798,833.

*To all whom it may concern:*

Be it known that I, WALTER C. HYATT, a citizen of the United States, residing at Seattle, in the county of King and State of Washington, have invented certain new and useful Improvements in Exercise-Sheets for Teaching Type-Writing, of which the following is a specification.

This invention has for its object the provision of improved means for teaching the technique of writing with a mechanical typewriter, and is designed to foster the habit and facility of writing by touch through the development of the pupil's sense of location with reference to the keys of the typewriter and to induce the pupil to keep his eyes and concentrate his thought upon the exercise and not upon the keyboard or the copy which he has written. To this end, I have provided a set or series of sheets each comprising an exercise sheet upon whose upper portion the lesson is printed together with certain other distinguishing designations, and a copy-sheet underlying the exercise sheet which is originally blank save for certain spaces for formal data to be filled in and upon which the practice work of the pupil is transcribed by means of carbon-paper interposed between said sheets.

The practice machine with which my improved set of sheets is to be used is devoid of its ink-ribbon and hence no readily visible impression is made upon the paper before the pupil's eyes but his whole thought and attention may be concentrated upon the exercise and the training of his powers of coördination of thought and hand. The work transcribed upon the underlying copy-sheet is thus a true record of the pupil's progress and skill without undue attention being given by him to becoming letter-perfect with sacrifice of more essential factors of thought-concentration and sureness of touch.

The invention consists in the novel sheets especially adapted for use upon a ribbonless typewriter, as will be fully described in the following specification, illustrated in the accompanying drawings, and finally set forth in the appended claims.

In said drawings, Figure 1 is a plan view of an exercise-sheet and copy-sheet contemplated in my invention and constituting a pair of sheets of which the set is made up arranged in operative position with the former partly broken away. Fig. 2 is a detached plan view of said copy-sheet.

Referring to said drawings, and particularly to Fig. 1, the reference numeral 1 designates an exercise-sheet of paper of standard letter or other suitable size adapted to be used in a typewriter. Upon said sheet, preferably upon its upper portion and arranged symmetrically with respect to the side margins of the paper, is printed the exercise matter 2 which the pupil is to transcribe. Said exercise is desirably arranged in parallel lines arranged transversely across the sheet with spaces between the several lines permitting one or more single-space typewritten lines therebetween reproducing the lesson immediately thereabove. Also upon this sheet may be printed in any suitable place, any instructional matter, as 3, which may be in a different style of type or placed in brackets [ ] to indicate that it is not a part of the exercise. Each lesson-sheet containing a different exercise is given an index character 4 printed in a convenient place thereon; such exercise-sheets being desirably arranged in series from the simple to the more complex and difficult, and the characters 4 will preferably indicate the same by being arranged in alphabetical or numerical order, as the case may be.

Referring now to Fig. 2, 5 indicates a sheet of paper, herein styled the copy-sheet, uniform in size with sheet 1. Sheet 5 is provided with blank space in its middle portion for the reception of the carbon impression made by the type-bars in contacting with the exercise-sheet. In the same relative position as upon sheet 1, an index-character 6 corresponding to the character 4 of sheet 1 may be printed or space provided therefor denoting the index number of the exercise copied while in close relation thereto may be space 7 for indicating by appropriate numeral $7^1$ the number of sheets filled by the respective exercise. The proper numeral $7^1$ is filled in by the pupil in order to indicate how many times the work had been done and the progress of the pupil indicated by comparison with earlier sheets. Preferably at the bottom of the sheet 5 are spaces to be filled out by pupil and teacher, respectively. In space 8 the pupil is to write his name and at 9 the date the work was done. Space 10 indicates where the pupil registers the amount of time required to complete the respective copy-sheet and at 11 he states the number of errors he has found in his own work. Therebelow, or in any suitable relation, the teacher or person examining the pupil's work writes or stamps his name at 12 and indicates at 13 and 14, respectively, the number of errors found and the relative merit of the work, as denoted by any arbitrary system of symbols desired.

To utilize my invention I first render the inking ribbon or other equivalent mechanism inoperative so that no perceptible marks are made upon the upper exposed sheet, as sheet 1, by the type-bars. This may be done in various ways in the different makes and types of machines, but is usually a simple operation not involving necessarily the removal of the ribbon spools or apparatus. The paper-sheets, as 1 and 5, are then inserted in the machine as usual with the former sheet outermost with a sheet of carbon-paper 15 therebetween. When the keys of the typewriter are struck, the type-bars will strike directly upon the outer sheet 1 leaving no visible marks thereon but will make an impression upon the copy-sheet 5 from the carbon-paper.

In the illustrated example shown in Fig. 1, the exercise matter 2 is arranged with two "spaces" of the typewriter paper-feed between each line and the copy is made upon the copy-sheet in single-space lines in these two spaces. Exercises may also be arranged with a single space therebetween or in any other suitable manner within the spirit of the invention. When the exercise is completed by filling the copy-sheet, the proper number 7¹ is inserted in space 7, the time required to complete the work is noted and the sheets are taken out of the machine and inspected by the pupil for errors marked by him in a characteristic manner, as 16, and the proper notations made in spaces 8, 9, 10 and 11. The teacher in turn inspects the sheet, marking the errors found by a distinguishing mark, as 17, and notes the results of his findings in spaces 12, 13 and 14. The sheet is then returned to the pupil with such comments and instructions as seem necessary. It will be noted that the index characters 4 and 6 of the sheet 1, and the copy-sheet 5, are the same, and thus the two sheets are readily identified as being associated together, and may be said to constitute a pair of coöperating sheets, a plurality of such pairs forming a set or series, which may properly be sufficient in number to provide for any pre-determined course, or term of instruction.

The utility of the improved sheets as an adjunct to a course of instruction in typewriting by the well-known touch system will be readily appreciated by those skilled in the art to which the invention relates, and the advantage of noting a pupil's progress by a comparison of the dated copy sheets constituting a set or series, will be apparent.

Having described my invention, what I claim, is—

1. As an article of manufacture, a pair of superposed exercise sheets for use upon a ribbonless typewriting machine, each bearing a similar identifying character, the upper one of said sheets bearing exercise matter, and a carbon sheet interposed between said exercise sheets, whereby the exercise will be printed upon the under sheet only, and the other sheet bearing designating places or spaces for entries of indexing data.

2. An educational device for use in teaching typewriting by the touch system comprising a plurality of pairs of superposed exercise sheets, each pair consisting of an upper sheet bearing exercise matter thereon, and an index character, and an under copy sheet bearing an index character similar to the index character on the companion sheet, a carbon sheet interposed between the exercise sheet and copy sheet, whereby the exercise will be printed upon the copy sheet only, the remaining sheet bearing designated places or spaces for entries of indexing data.

Signed at Seattle, Wash., this 18th day of October, 1913.

WALTER C. HYATT.

Witnesses:
 HORACE BARNES,
 E. PETERSON.